J. B. HAWLEY.
Hay Elevator.
No. 43,946.     Patented Aug. 23, 1864.
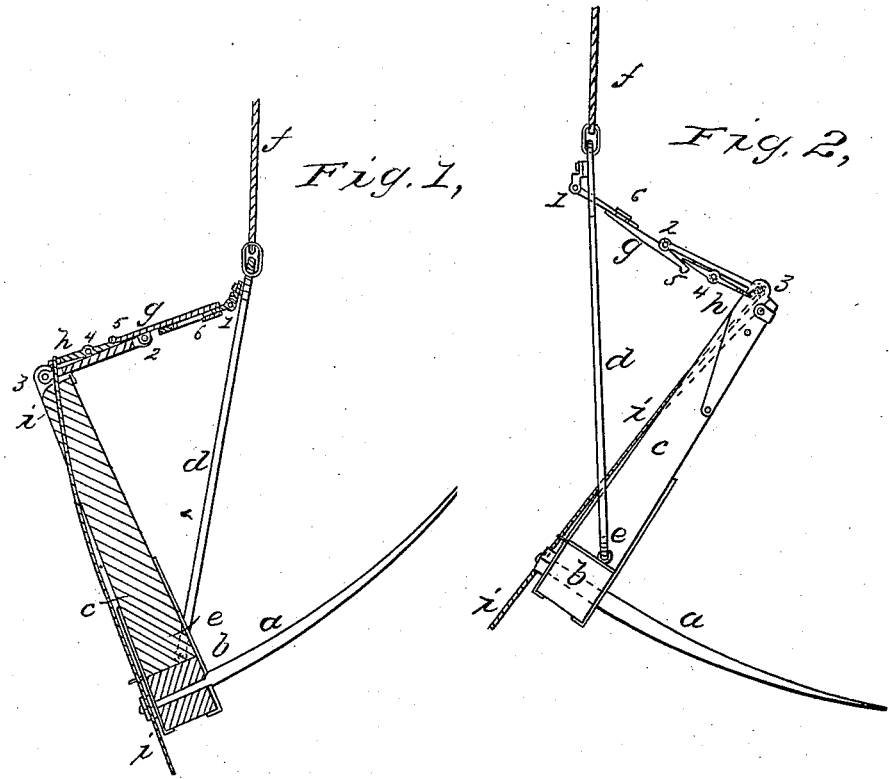
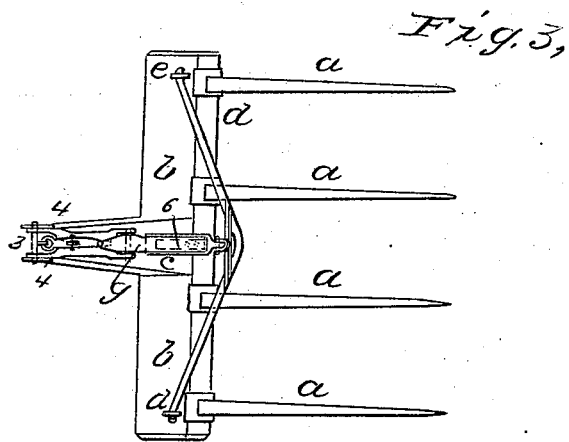

UNITED STATES PATENT OFFICE.

JOHN B. HAWLEY, OF ALBANY, NEW YORK, ASSIGNOR TO PETER MESICK, OF SAME PLACE.

IMPROVEMENT IN HAY-ELEVATING FORKS.

Specification forming part of Letters Patent No. 43,946, dated August 23, 1864.

*To all whom it may concern:*

Be it known that I, JOHN B. HAWLEY, of the city and county of Albany, and State of New York, have invented, made, and applied to use a certain new and useful Improvement in Hay-Elevators; and I do hereby declare the following to be a full, clear, and exact description of the said invention, reference being had to the annexed drawings, making part of this specification, wherein—

Figure 1 is a side elevation of my said hay-elevator as ready for use. Fig. 2 is a similar view of the same after the hay has been discharged, and Fig. 3 is a plan of said fork or elevator.

Similar marks of reference denote the same parts.

Hay forks or elevators to be operated by horse-power have heretofore been constructed with a swinging bail, to which the rope for hoisting is connected, and such bail has been connected with the handle of the fork by a loop or latch, so that the bail and fork would move together in elevating the hay, and then deliver the hay by the fork swinging below said bail, when the said latch is disconnected by pulling on a second rope or line, to the attendant.

The nature of my said invention consists in a lever connected to the discharging-rope and applied to move a brace that renders the fork stiff or rigid when being elevated with the hay, and allows said fork to swing in discharging the hay, said lever causing the discharging-rope to operate much more easily than when said rope is connected directly to the brace.

In the drawings, $a$ $a$ are tines, of suitable size and shape, extending from a head, $b$.

$c$ is a handle or standard upon the head $b$, and $d$ is a bail hinged at $e$ to the head $b$, and $f$ is the hoisting or elevating rope passing through a pulley overhead, and thence down to the horse or horses, to be acted upon in the well-known manner in drawing up the hay-elevator, or lowering the same, or conveying it over the load or mow.

$g$ is a hinged brace extending from the bail $d$ to the head of the handle $c$, one end of this brace being attached by a joint, 1, to the bail $d$, the other end, by the joint 3, to the handle $c$, and the brace itself being of two pieces united by the joint 2. At one end of the brace $g$ is a slide at 6, which allows the brace to extend or contract at this point, for a purpose hereinafter named.

$h$ is a lever on a fulcrum, 4, to one end of which the discharging-rope $i$ is connected, and the other end of said lever passes under the end 5 of one part of the brace $g$.

The operation of this fork is as follows: When the fork is in the position shown in Fig. 1, with the weight of hay resting upon the tines $a$, the sliding portion 6 of the brace will be toward the bail $d$, and upon drawing upon the discharging-rope $i$ the lever $h$ will cause the part 5 and joint 2 to be raised, so that the brace $g$ will fold together as a toggle-joint, allowing the handle $c$ to swing under the bail $d$ and deliver the hay from the tines, in which case the sliding part 6 of the brace draws out sufficiently to allow the fork to assume such an angle to the brace that the hay will slide freely from the tines, as seen in Fig. 2.

What I claim, and desire to secure by Letters Patent, is—

A lever applied to a brace in a hay-fork and connected to the discharging rope or cord to move the said brace in discharging the hay, substantially as specified.

In witness whereof I have hereunto set my signature this 30th day of January, A. D. 1864.

J. B. HAWLEY.

Witnesses:
R. H. WELLS,
L. P. TAYLOR.